Figure 8:
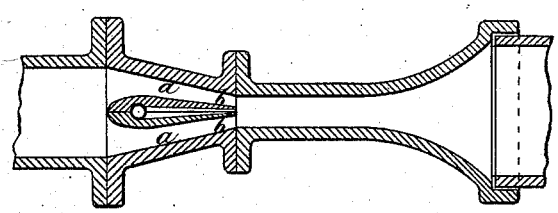

C. JAMES.
Apparatus for Exhausting and Propelling Air.
No. 162,824.
4 Sheets--Sheet 1.
Patented May 4, 1875.
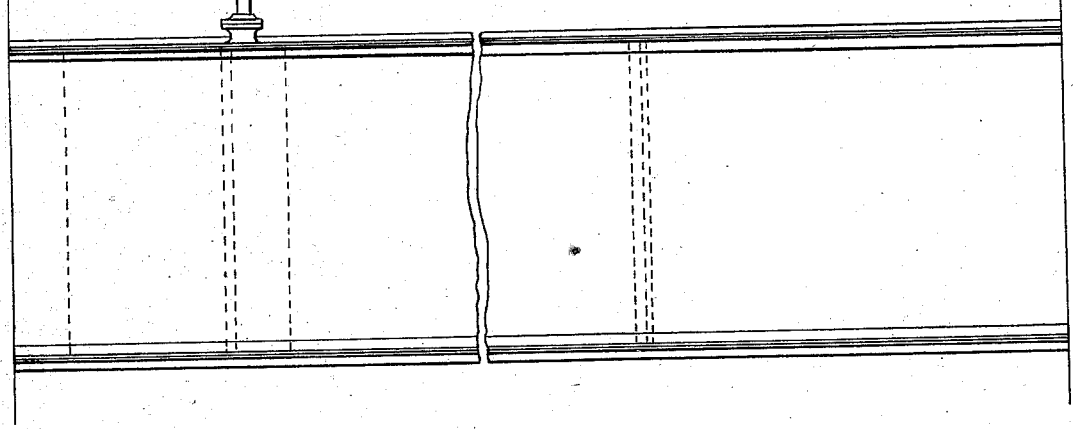
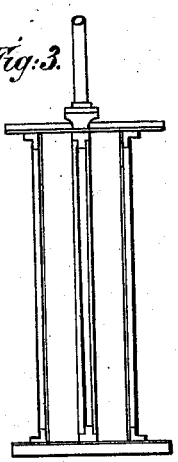
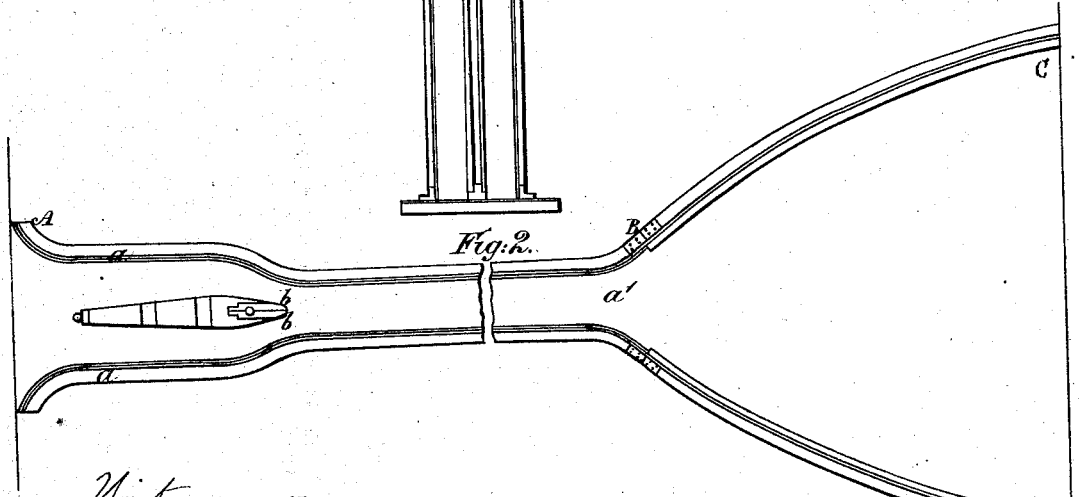
Witnesses
Wm. G. Ladd
James M. Hicks
Inventor
Christopher James
by his atty
Wm C. Hicks C. JAMES.
Apparatus for Exhausting and Propelling Air.
No. 162,824.
4 Sheets--Sheet 2.
Patented May 4, 1875.
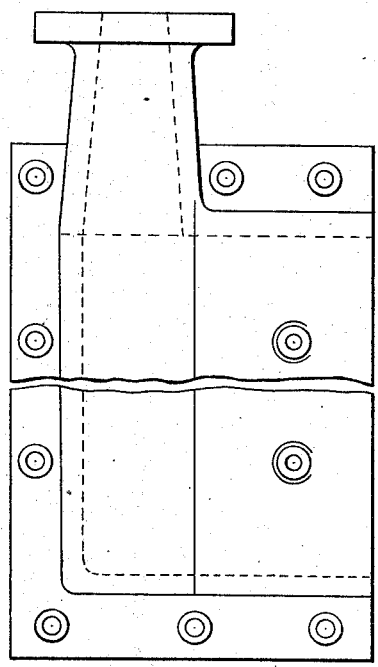
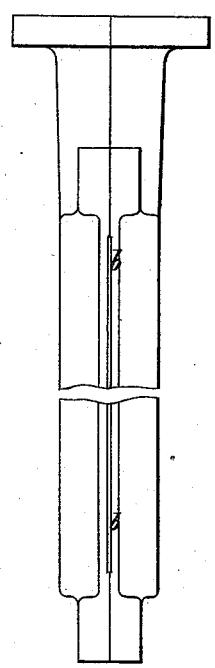
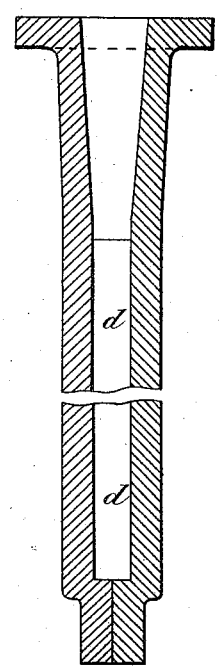
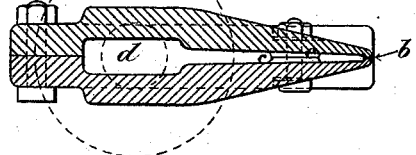

4 Sheets--Sheet 3.

C. JAMES.
Apparatus for Exhausting and Propelling Air.

No. 162,824. Patented May 4, 1875.

Witnesses
Wm. G. Ladd.
James M. Hicks

Inventor
Christopher James
by his atty
Wm. C. Hicks.

THE GRAPHIC CO.PHOTO-LITH.39 & 41 PARK PLACE, N.Y.

4 Sheets--Sheet 4.
C. JAMES.
Apparatus for Exhausting and Propelling Air.
No. 162,824. Patented May 4, 1875.
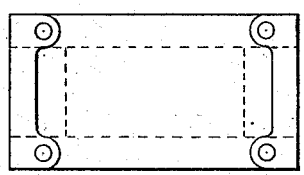
Fig. 10.
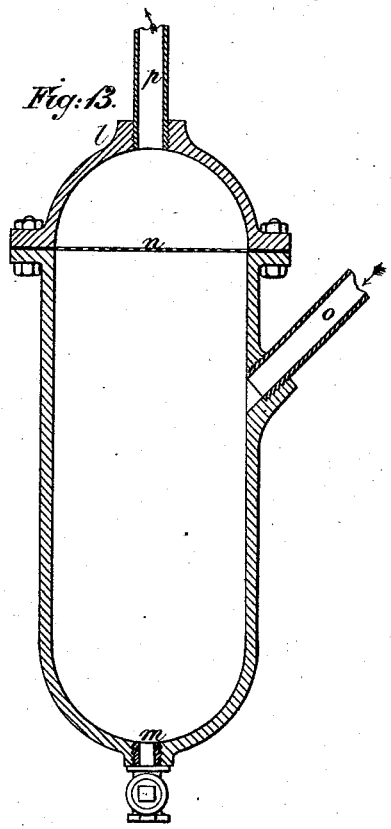
Fig. 13.
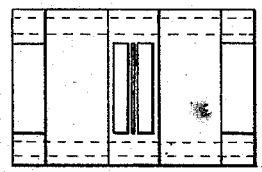
Fig. 11.
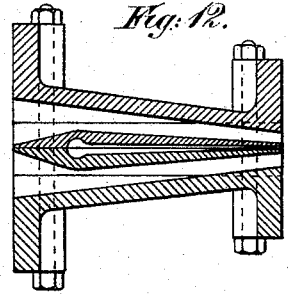
Fig. 12.
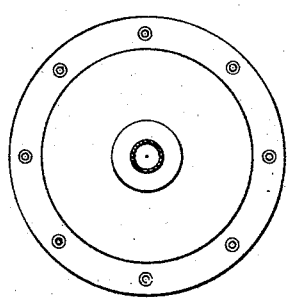
Witnesses
Wm G. Ladd
James M. Hicks
Inventor
Christopher James
by his atty
Wm C Hicks
THE GRAPHIC CO. PHOTO-LITH. 39 & 41 PARK PLACE, N.Y.

UNITED STATES PATENT OFFICE.

CHRISTOPHER JAMES, OF BRISTOL, ENGLAND.

IMPROVEMENT IN APPARATUS FOR EXHAUSTING AND PROPELLING AIR.

Specification forming part of Letters Patent No. 162,821, dated May 4, 1875; application filed October 22, 1874.

*To all whom it may concern:*

Be it known that I, CHRISTOPHER JAMES, consulting engineer, of 10 Upper Sydenham Road, in the city of Bristol, England, a subject of the Queen of Great Britain, have invented or discovered new and useful Improvements in Apparatus for Exhausting, Forcing, and Propelling Air and other Fluids; and I, the said CHRISTOPHER JAMES, do hereby declare the nature of the said invention, and in what manner the same is to be performed, to be particularly described and ascertained in and by the following statement thereof—that is to say:

This invention has for its object improvements in apparatus for exhausting, forcing, and propelling air and other fluids. For this purpose I cause steam or other fluid under pressure to issue from a long, straight, and narrow slit, which is inclosed within a casing, into which the air or other fluid to be acted upon by the motive-jet is admitted, and the casing is so constructed as to bring the fluid to be operated upon into close contact with the motive-jet. The passage through which the motive-jet is caused to issue is made in two parts, being divided lengthwise of the orifice, and the two parts are bolted together. In order that the orifice may not become clogged by particles carried mechanically by the steam or fluid, I cause the steam or fluid to pass upward through a straining-vessel, which is made in two parts, bolted together with a strainer of wire-gauze, or such like material, between the parts. The straining-vessel also serves to separate from the steam any water which is primed over from the boiler, and there is a tap at the bottom of the vessel to draw off the water, which may accumulate in it, and to empty the vessel.

In the manufacture of the apparatus the proportions of the parts are varied according to the work the apparatus has to perform, and the circumstances under which it is required to operate, and afterward no adjustment is required; but it is capable of easy adjustment should the circumstances for which it is required be altered, so that the apparatus is simple and inexpensive in construction, and requires no skill in its use; and in order that my invention may be fully understood and readily carried into effect, I have in the annexed drawings hereunto annexed shown various views of apparatus constructed as above described.

At Figure 1 is shown a sectional elevation; at Fig. 2 a sectional plan view; and at Fig. 3 a transverse vertical section of apparatus suitable for forming a current of air in a ventilating-shaft, and for other such like purposes. Figs. 4, 5, 6, and 7 show respectively, on a larger scale, a side elevation, transverse section, front elevation, and vertical section of the parts forming the straight narrow slit for the motive-jet, and the chamber for supplying thereto steam or other fluid under pressure.

In Fig. 2, *a a* is the outer casing, the end *a'* of which opens into the atmosphere. Between the points A and B this casing is lined with sheet metal, but between the points B and C it may be simply lined with wooden boards. *b b* is the narrow slit, from which the motive-jet is to issue. This is formed of two plates of cast-iron bolted together, as shown at Figs. 4, 5, 6, and 7. The edges of the plates which are to be bolted together are planed to bring them to a flat surface. The lips at the front edges of the plates are also planed, so that when the two plates are put together the space between the two lips shall form a straight slit of the width desired. In order also to retain this slit at a uniform width from end to end, the two plates may have each cast with them distance-pieces *c c*, which are planed down to the same level as the edges which are to be bolted together, and bolts are passed through them as well as through the side edges. The space *d*, between the plates, forms a chamber from which steam or other fluid under pressure is supplied to the straight slit, and the plates are each made of such a form that, brought together, the top of the chamber *d* terminates in a short tube, having a flange around its upper end, to which a pipe for supplying steam or other fluid under pressure to the chamber can be connected.

By constructing the slit and chamber in connection therewith in the manner above described, the parts are very readily and cheaply constructed, and can be quickly taken apart to be cleaned, and again put together, should the slit at any time become obstructed by any matters carried along into it by the steam or other fluid under pressure.

Figure 9:
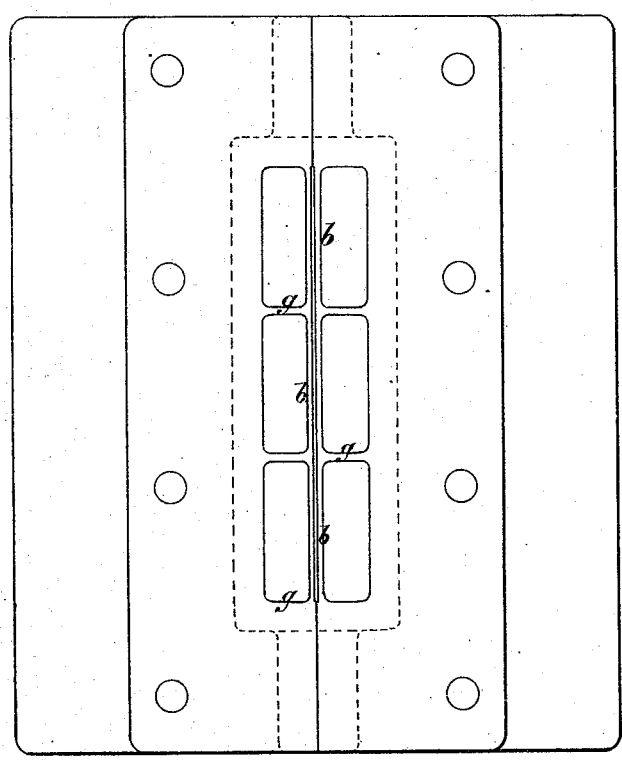

A modification of the above arrangement is shown at Fig. 8. In this modification the outer casing $a$ is cast together in one piece with the plates $b$; in other respects the apparatus is similar to that previously described, so that it is unnecessary to give any further description of it. When the slit of this apparatus is to be of considerable length I support the two plates composing the slit by ribs $g\ g$ cast with them, as shown at Fig. 9.

In some cases also, in place of forming the apparatus in two castings, as shown at Fig. 8, it may be divided into four castings, in the manner shown at Figs. 10, 11, and 12, the edges of the castings being all planed true, and bolted together as when two castings only are used.

At Fig. 13 I have shown a vertical section of the apparatus I employ for keeping back from the slit all solid matters or water which may be carried over with the steam from the steam-boiler. It is made in two parts, $l\ m$, bolted together, as shown, with a strainer, $n$, of fine wire-gauze placed between them. Steam, from a steam-boiler, is admitted into to the lower part $m$ by the pipe $o$, and, rising upward through the wire-gauze, passes away by the pipe $p$, to the straight slit of the apparatus, above described.

I would state that although I prefer to use a straining or filtering apparatus, such as above described, together with the straight-slit apparatus, yet such apparatus may be used either with or without the straining apparatus. Jet apparatus, similar to that hereinbefore described, may be employed for exhausting or forcing air and other fluids for a great variety of purposes.

Having thus described the nature of my invention, and the manner of performing the same, I would have it understood that I claim—

1. The combination, substantially as hereinbefore set forth, of a narrow straight jet casing or pipe, with an exterior casing, connected as described, and forming a narrow passage around it, through which the air or other fluid to be acted upon is admitted, and which is so constructed as to bring the said fluid in close contact with the inner jet-pipe, as set forth.

2. The jet-casing, as described, divided lengthwise of its orifice, and with bolts bolted or fastened together, as shown in Figs. 1 to 7.

CHRISTOPHER JAMES.

Witnesses:
 ALFRED BRITTAN,
  *Sol'r, Albion Chambers, Bristol.*
 CHARLES MILLER,
  *His Clerk.*